United States Patent
Agarwal et al.

(10) Patent No.: US 9,692,733 B2
(45) Date of Patent: Jun. 27, 2017

(54) KEY ESTABLISHMENT AND MANAGEMENT PROTOCOL OPTIMIZATIONS IN VIEW OF CHANNEL RELIABILITY

(71) Applicant: Red Hat, Inc., Raleigh, NC (US)

(72) Inventors: Avesh Agarwal, Cary, NC (US); Eric Paris, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 89 days.

(21) Appl. No.: 14/618,892

(22) Filed: Feb. 10, 2015

(65) Prior Publication Data

US 2016/0234172 A1    Aug. 11, 2016

(51) Int. Cl.
*H04L 29/06* (2006.01)
*H04L 29/08* (2006.01)

(52) U.S. Cl.
CPC ........ *H04L 63/0428* (2013.01); *H04L 63/061* (2013.01); *H04L 67/104* (2013.01)

(58) Field of Classification Search
None
See application file for complete search history.

(56) References Cited

U.S. PATENT DOCUMENTS

| | | | | |
|---|---|---|---|---|
| 6,516,192 B1 * | 2/2003 | Spaur | ................. | H04W 72/042 455/450 |
| 7,756,155 B2 | 7/2010 | Duggirala et al. | | |
| 8,266,286 B2 | 9/2012 | Kamarthy et al. | | |
| 8,671,273 B2 | 3/2014 | Roy-Chowdhury et al. | | |
| 8,731,542 B2 | 5/2014 | Tervahauta et al. | | |
| 8,782,222 B2 | 7/2014 | Luna et al. | | |
| 8,849,961 B2 | 9/2014 | Hartikainen et al. | | |
| 8,924,509 B2 * | 12/2014 | Schmidt | .............. | H04L 12/2809 709/201 |
| 2008/0291839 A1 * | 11/2008 | Hooper | ............... | H04L 12/2697 370/248 |
| 2009/0063686 A1 * | 3/2009 | Schmidt | .............. | H04L 12/2809 709/227 |
| 2011/0119487 A1 * | 5/2011 | Alexander | ............ | H04L 9/0891 713/160 |
| 2012/0170471 A1 * | 7/2012 | Brown | ................... | H04W 48/20 370/252 |

OTHER PUBLICATIONS

"Step-by-Step Guide to Internet Protocol Security (IPSec)", Feb. 17, 2000, 24 pages, https://msdn.microsoft.com/en-us/library/bb742429(d=printer).aspx,accessed (Nov. 10, 2015).

(Continued)

*Primary Examiner* — Kaveh Abrishamkar
(74) *Attorney, Agent, or Firm* — Lowenstein Sandler LLP (57) ABSTRACT

A peer device may determine a reliability level of a connection with another peer device during a learning duration at instances in a communication session. The connection can be established using key establishment and management protocols. The peer device can adjust a frequency with which the peer device determines the reliability level of the connection during the communication session. The peer device can determine an updated reliability level of the connection in view of the adjusted frequency, and then optimize resource utilization by key establishment and management protocols.

20 Claims, 5 Drawing Sheets

(56) References Cited

OTHER PUBLICATIONS

"Key Management: Key Authority- Centralized Key Management", 2 pages, https://www.thales-esecurity.com/products-and-services/products-and-services/key-management-systems/keyauthority, accessed (Nov. 10, 2015).
Kaufman et al., Internet Key Exchange Protocol Version 2 (IKEv2),138 pages (Sep. 2010).
"Internet Key Exchanges Protocol", 2 pages, http://publib.boulder.ibm.com/html/as400/v4r5/ic2979/info/RZAJASECASSOCIA-TIONS.HTM, accessed (Nov. 10, 2015).
Price et al., "Still Alive: Extending Keep-Alive Intervals in P2P Overlay Networks," 2009, School of Computer Science University of Birmingham Birmingham, United Kingdom, 10 pages.
Allen, et al., "Adaptive Timeout Discovery using the Network Weather Service," Jul. 24-26, 2002, Computer Science Department University of California, Santa Barbara; Computer Science Department University of Tennessee, Knoxville 8 pages.
Sengul et al., "A Survey of Adaptive Services to Cope with Dynamics in Wireless Self-Organizing Networks," Dec. 2011, ACM Computing Surveys, Article 1, 35 pages.
Huang et al., "A Traffic-Based Method of Detecting Dead Internet Key Exchange (IKE) Peers," https://tools.ieff.org/html/rfc3706, 13 pages, Feb. 2004.
Kaufman et al., "Internet Key Exchange Protocol Version 2 (IKEv2)," https://tools.ietf.org/html/rfc7296, 143 pages, Oct. 2014.
Migault et al., "Cloning the IKE Security Association in the Internet Key Exchange Protocol Version 2 (IKEv2)," https://tools.ietf.org/html/rfc7791, 15 pages, Mar. 2016.

\* cited by examiner

Reliable Communication Connection

| Learning Duration 102 | Learning Interval 104 | Learning Duration 102 | Learning Interval 106 | Learning Duration 102 |

FIG. 1

| Learning Duration 202 | Learning Interval 208 | Learning Duration 202 | Learning Interval 210 | Learning Duration 202 | Learning Interval 212 | Learning Duration 202 | Learning Interval 214 |

Unreliable Communication Connection

| Learning Duration 302 | Learning Interval 304 | Learning Duration 302 | Learning Interval 306 | Learning Duration 302 | Learning Interval 308 |

Unreliable — Unreliable — Becoming Reliable — Reliable — Reliable

FIG. 3B

| Learning Duration 302 | Learning Interval 314 | Learning Duration 302 | Learning Interval 316 | Learning Duration 302 | Learning Interval 318 | Learning Duration 302 |

Reliable — Reliable — Becoming Unreliable — Temporarily Unreliable — Unreliable

FIG. 3C

| Learning Duration 302 | Learning Interval 324 | Learning Duration 302 | Learning Interval 326 | Learning Duration 302 | Learning Interval 328 |

Reliable — Reliable — Becoming Unreliable — Temporarily Unreliable — Becoming reliable — Reliable

KEY ESTABLISHMENT AND MANAGEMENT PROTOCOL OPTIMIZATIONS IN VIEW OF CHANNEL RELIABILITY

The present disclosure pertains to connections between peer devices; more specifically, pertaining to key establishment and management protocols optimization in view of determining a reliability of a connection between peer devices.

BACKGROUND

Peer devices that communicate data can be distributed at different locations in a communications network. The peer devices can communicate voice data (e.g., telephone calls), stream videos or music data, and send information using different types of communication connections or channels. The different types of communication channels can include wireline channels (such as communications over coaxial cables or optic fiber cables) and wireless channels (such as cellular network channels, wireless network channels, Bluetooth channels, and so forth).

With an increase in distributed networks and use of peer devices, security between peer devices is becoming increasingly important. Key establishment and management protocols can be used to establish and maintain secure communication connections between peer devices. To securely communicate data, common keys can be agreed upon or established by the peer devices to encrypt and decrypt sensitive data. With an increasing number of peer devices communicating an increasing amount of information, connectivity between the peer devices can go down unexpectedly. Key establishment and management protocols can also be used to manage communication issues between peer devices.

DETAILED DESCRIPTION

Described herein are methods and systems by which data is securely communicating content between peer devices.

As a number of peer devices increase, the use of network resources to establish and manage secure connections may also increase. The key establishment and management protocols can govern processes used to protect communications between peer devices in a distributed network. Peer devices can be smartphones, tablet devices, laptops, personal computers, and other processing devices that can communicate data in a communication network using a communication connection.

Traditional key establishment and management protocols are not responsive to underlying network behaviors and communication connection issues (such as down communication connections) between peer devices. For example, a communication connection may be lost because of routing problems, channel interference, devices crashing or restarting, one host rebooting, and so forth. When a peer device is unaware that the connection has been lost with another peer device, data communicated between the peer devices may be lost (e.g. packet loss). Typically key establishment and management protocols can employ keepalive detection or dead peer detection (DPD) schemes to monitor when a connection between peer devices has gone down or is lost. The detection of a loss of the connection can be used to maintain secure data communications between the peer devices and to enable peer devices to failover to different peer devices, switch connections, and/or recover lost data. While keepalive schemes or DPD schemes can be used as mechanisms to monitor for communication issues and channel connectivity between peer devices, traditionally the keepalive schemes or DPD schemes use constant monitoring protocols to detect when communication channels or connections go down. The continuous connectivity monitoring can be resource intensive, e.g., consuming and wasting central processing unit (CPU) resources and/or memory resources, consuming bandwidth of the network and increasing traffic in the communication network, and causing overhead for message processing.

The constant monitoring by the keepalive schemes and/or the DPD schemes is not adaptive to network behavior that changes during a communication session between peer devices. For example, the keepalive schemes and the DPD schemes do not take into account past or present behavior of a communication channel between peer devices and when a peer device does not respond for a threshold period of time, the peer devices take down the communication connection between the peer devices. In this example, even when the communication connection between the peer devices has previously been reliable for an extended period of time (such as several hours), under the traditional key establishment and management protocols the peer devices take down the communication connection after the communication connection is unavailable for a period of time (such as a few minutes). Additionally, implementation and installation for large numbers of simultaneous peer device communication sessions using the traditional keepalive scheme or DPD scheme can be difficult.

Aspects of the present disclosure address the above noted deficiency of the traditional key establishment and management protocols by implementing key establishment and management protocols that use a connection reliability scheme to monitor a communication connection. The connection reliability scheme can use a learning mode to adjust a frequency that a channel or connection is monitored at. In an illustrative example, a peer device can monitor a reliability of a channel for a period of time (learning duration) at different instances in time. The different instances in time can be spaced out according to learning intervals of time (e.g. a time between different learning durations).

The peer device can adjust the learning duration and/or the learning interval in view of a reliability level of the communication connection. One advantage of the key establishment and management protocols using a connection reliability scheme can be to provide protocols that can adjust with a dynamic or changing network behavior (e.g. a network behavior that changes over time). In one example, as a peer device determines that a reliability level of a communication channel exceeds a threshold level (e.g. a reliable communication connection), the peer device can increase a learning interval to free local and/or network resources. In another example, as the peer device determines that the reliability level of the communication channel is below a threshold level, the peer device can decrease a learning interval to determine when the reliability of the channel has decreased to a level where the peer devices may failover to another communication channel (e.g. the peer device may tear down the communication connection).

Peer devices using a learning mode of a connection reliability scheme can adjust a frequency at which the connection may be monitored and/or the interval length during which the connection may be monitored. In one example, peer devices can use a connection reliability scheme to monitor a communication connection. When a communication connection has been established between peer devices, a key establishment and management service with the learning mode can be run by one or more of the peer devices for a period of time (learning duration) between different intervals of time (learning interval). In one example, the learning duration can be a preconfigured duration of time or a fixed interval of time. In another example, the learning duration can vary in view of a reliability of the connection between the peer devices.

Figure 1:
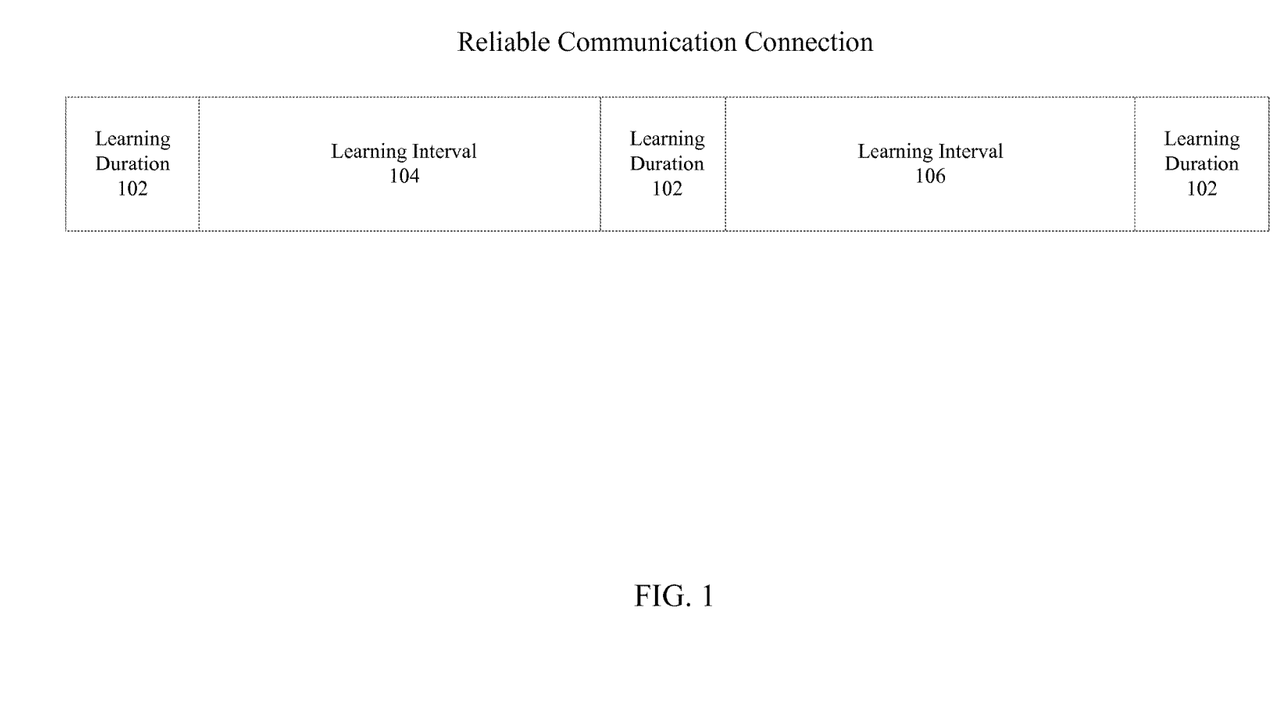
FIG. 1 illustrates operations of a peer device when the communication connection is reliable according to one embodiment.

FIG. 1 illustrates operations of a peer device when the communication connection is reliable, in accordance with some aspects of the present disclosure. FIG. 1 further illustrates a peer device using key establishment and management protocols with a learning mode to monitor a connection between peer devices. The peer device or a network management device can monitor the reliability of the connection during learning durations 102 and cease monitoring the connection during learning intervals 104 and 106. When the connection is reliable (e.g. the packet loss of the connection may be below a threshold loss level), the learning intervals 104 and 106 can be within a first interval length, such as a relatively long interval in comparison to learning intervals 208, 210, 212, and 214 for an unreliable connection as discussed for FIG. 2.

In one example, the threshold loss level of the packet loss for a connection can be a predefined level. In another example, the threshold loss level of the packet loss for the connection can be selected by a system administrator or a peer device based on a type of data communicated between peer devices and/or an amount of data communicated between the peer devices. For example, when data communicated between the peer devices is security data or sensitive information, the system administrator or the peer device can set the threshold loss level at a low level (such as a zero packet loss level). In another example, when the data communicated between the peer devices is non-critical data, the system administrator or the peer device can set the threshold loss level at a high level.

Figure 2:
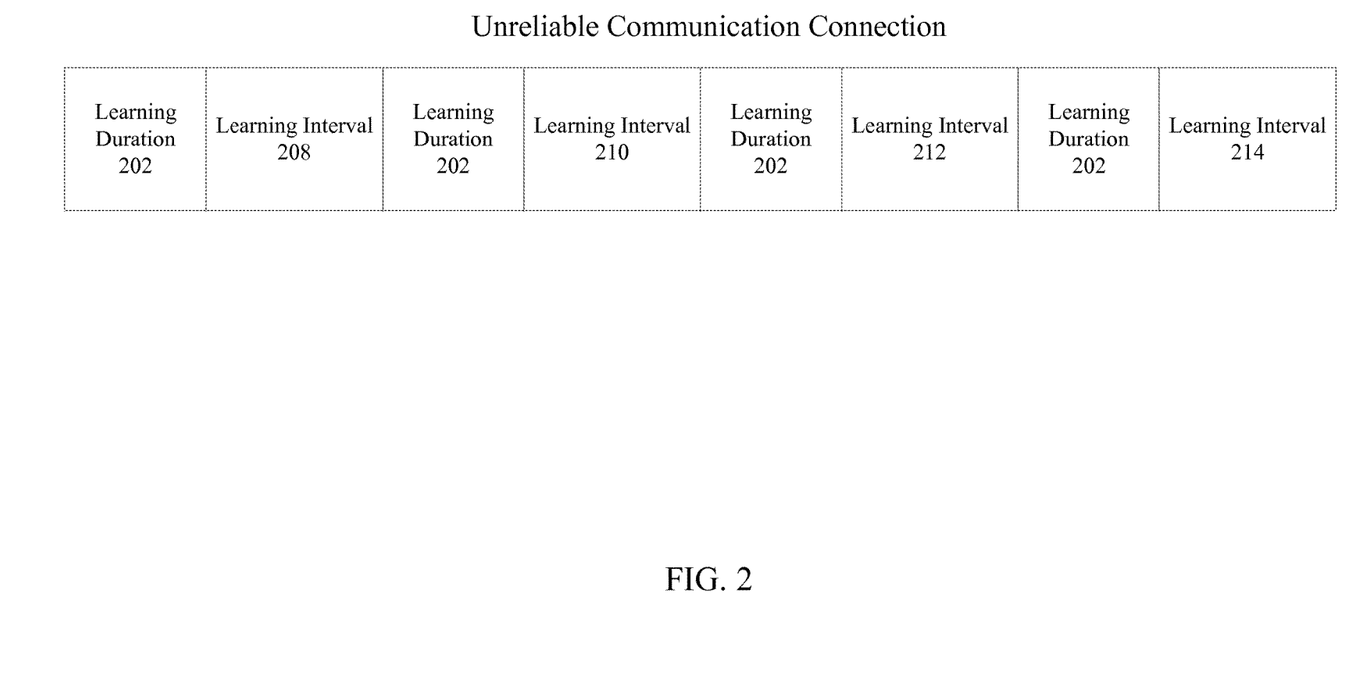
FIG. 2 illustrates operations of a peer device when the communication connection is unreliable according to one embodiment.

FIG. 2 illustrates operations of a peer device when the communication connection is unreliable. FIG. 2 further illustrates a peer device using a learning mode to monitor a connection between peer devices. The peer device can monitor the reliability level of the connection during the learning durations 202 and cease monitoring the connection during learning intervals 208-214. When the connection is unreliable (e.g. the packet loss of the connection exceeds a threshold loss level) the learning intervals 208, 210, 212, and/or 214 can be within a second interval length, such as a relatively short interval in comparison to the learning intervals 104 and 106 of the reliable connection as discussed for FIG. 1.

The learning mode can be run along with the operations of establishing and maintaining connections between the peer devices. During learning durations of the learning mode, the key establishment and management protocols can use ping packets, unidirectional or bi-direction request and acknowledgement messages, data traffic monitoring, and so forth to determine a reliability level of the network. In one example, packet loss can be determined using a ping protocol. In this example, a first peer device can send an Internet control message protocol (ICMP) echo request (e.g., a ping command) to a second peer device, where the ICMP echo request directs a second peer device to echo or resend one or more packets in the ICMP echo request back to the first peer device. When the second peer device receives the ICMP echo request, the second peer device can send an ICMP response, where the ICMP response includes the same packets as the second peer device received in the ICMP echo request. In one example, the first peer device can compare the packets received from the second peer device (ICMP response packets) with the packets sent by the first peer device (ICMP echo request packets) to determine an amount of packets that were not received from the second peer device or were lost (e.g., packet loss). In another example, the first peer device can determine when ICMP response packets contain errors or inconsistencies when compared with the ICMP echo request packets (e.g., packet errors). In another example, the first peer device can determine an amount of time between the first peer device sending the packets and the first peer device receiving the packets (e.g., a packet delay period). In this example, the first peer device can use the packet delay period and the packet loss to determine a rate that the packets are lost (e.g., a packet loss rate). In another example, the first peer device can determine a path or channel used to communicate packets with the second peer device and can associate a packet loss and/or a packet loss rate with the determined path or channel.

In one example, the reliability level of the network can be determined by using reliability criteria, including: a packet loss rate between peer devices; a packet delay period between peer devices; packet errors; and so forth. In another example, the reliability criteria used can be selected in view of: a type of communication network the peer devices are using; a type of peer devices communicating; a type of application the peer devices are used for in the communication network; a communication protocol for the peer devices; a type of application running on a processor of the peer device; and so forth.

In one example, a reliable communication connection can be a communication connection with a packet loss rate below a threshold rate, such as a zero packet loss rate. In another example, an unreliable communication connection can be a communication connection with a packet loss rate that exceeds the threshold rate, such as a full packet loss rate. In another example, a reliable communication connection can be a communication connection with a packet loss amount below a threshold amount, such as zero packet losses. In another example, an unreliable communication connection can be a communication connection with the packet loss amount that exceeds a threshold amount, such as a non-zero packet loss amount.

Figure 3A:
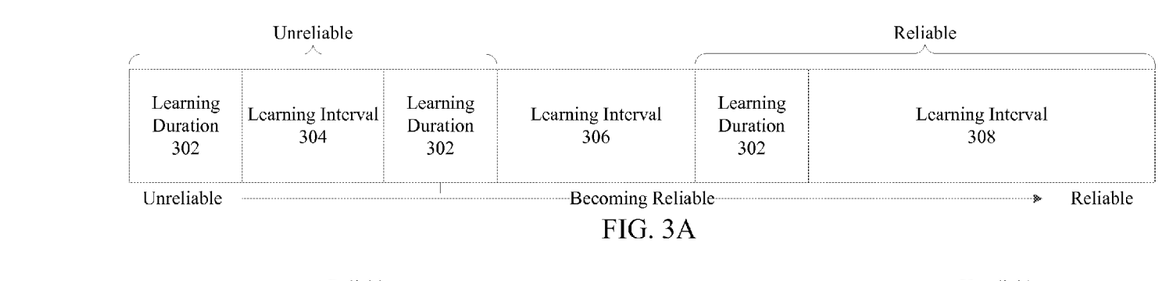
FIG. 3A illustrates an unreliable connection between the peer devices that may be increasing in reliability according to one embodiment.

The learning interval can be adjusted in view of the reliability level of the communication connection between peer devices. FIG. 3A illustrates an unreliable connection that may be increasing in reliability, in accordance with some aspects of the present disclosure. FIG. 3A further illustrates that as the connection transitions from an unreliable connection to a reliable connection, the learning intervals 304, 306, and 308 can progressively increase in length of time between the learning durations 302. In FIG. 3A, the learning intervals 304, 306, and 308 between the learning durations 302 (i.e. the connection reliability checks) can be lengthened or increased (e.g., fewer communication connection reliability checks) when the reliability level of the connection transitions from unreliable to reliable.

Figure 3B:
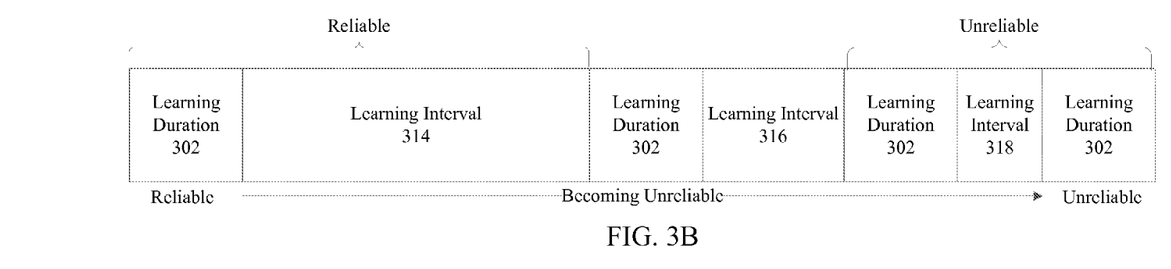
FIG. 3B illustrates a reliable connection between the peer devices that may be decreasing in reliability according to one embodiment.

FIG. 3B illustrates a reliable connection that may be decreasing in reliability, in accordance with some aspects of the present disclosure. FIG. 3B further illustrates that as the connection transitions from a reliable connection to an unreliable connection, the learning intervals 314, 316, and 318 can progressively decrease in length of time between the learning durations 302. In FIG. 3B, the learning intervals 314, 316, and 318 between the learning durations 302 (i.e. the connection reliability checks) can be shortened or decreased (e.g. additional communication connection reliability checks) when the reliability level of the connection transitions from an unreliable to reliable.

Figure 3C:
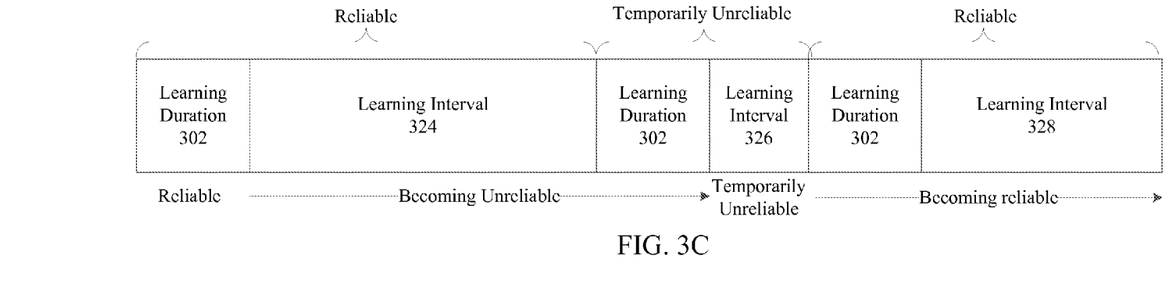
FIG. 3C illustrates a reliable connection between the peer devices that may be temporarily unreliable according to one embodiment.

FIG. 3C illustrates a reliable connection that may be temporarily unreliable, in accordance with some aspects of the present disclosure. FIG. 3B further illustrates that as the connection transitions from an reliable connection to a temporarily unreliable connection and back to a reliable connection, the learning intervals 324, 312, and 328 can progressively decrease and increase in length of time between the learning durations 302 in view of the reliability of the connection. In FIG. 3C, the learning intervals 324, 326, and 328 between the learning durations 302 (i.e. the connection reliability checks) can vary as the reliability level of the connection varies between reliable and unreliable.

The increase or decrease of the learning interval as shown in FIGS. 3A-3C can enable peer devices in the network to adapt to variations in the reliability of a communication connection between the peer devices. In one example, when there are several communication connections between peer devices, the connection reliability scheme can be used for each communication connection between the peer devices. In another example, when there are several communication connections between the peer devices, the connection reliability scheme can be used for the overall connection between the peer devices. In this example, an overall connection can be multiple communication connections, where a reliability level threshold is set for the multiple communication connections as a whole rather than for each communication connection individually. For example, when a first peer device uses multiple communication connections to communicate data with a second peer device, the first peer device can determine a reliability level of each of the individual communication connections and aggregate the individual reliability levels to obtain an aggregate or overall connection reliability level. The first peer device can then adjust the reliability level of the overall connection based on the aggregate or overall connection reliability level. An advantage of using the connection reliability scheme for the overall connection between peer devices can be to decrease bandwidth use in the communication network.

In one example, the key establishment and management protocols can use the connection reliability scheme with a bounded learning interval (e.g. having minimum and/or maximum interval limits). For example, the learning interval can have a lower bound (such as zero) and an upper bound (such as a rekey duration). The rekey duration can be a maximum amount of time that data can be encrypted using an encryption key before the encryption key is switched. Rekeying can be a process of changing the session key (e.g., an encryption key of an ongoing communication) to limit an amount of data encrypted using a same encryption key. The rekey duration for changing the encryption key can be a threshold amount of data, determined by a system administrator or a peer device, that is communicated between peer devices. For example, when a first peer device has communicated 100 megabytes of data, the rekey duration can expire and a new encryption key can be used by the peer devices. In another example, the rekey duration can a threshold period of time, determined by a system administrator or a peer device. For example, when the first peer device has communicated data for 5 milliseconds, the rekey duration can expire and a new encryption key can be used by the peer devices. The rekeying can be implemented using a protocol such as an Internet key exchange (IKE) protocol, an over the air rekeying (OTAR) protocol, or a temporal key integrity protocol (TKIP).

In one example, when the learning interval is at lower bound, such as at a starting point of a communication between peer devices or at some later point in time during a communication between devices, the communication connection may have been behaving unreliably. In another example, when the learning interval is at lower bound, the peer devices may monitor the communication connection using the connection reliability scheme continuously or near continuously (e.g. a learning interval set to zero or to a minimum bound between the learning durations). The minimum bound can be a predefined threshold value or a threshold value selected by a system administrator or a peer device, where the peer devices may monitor the communication connections continuously or near continuously when the learning interval decreases below the minimum bound.

In one example, when the learning interval exceeds a threshold length, such as length of time that is greater than or equal to the rekey duration, the communication connection may be a reliable connection. When the learning interval has reached an upper bound, then the peer devices may monitor the communication connections using the connection reliability scheme with a maximum interval between the learning durations. One advantage of using the connection reliability scheme when the communication connection is reliable for a threshold period of time, can be that the connection reliability scheme can switch the peer device to an inactive mode for a threshold period of time, such as a rekey duration, where the communication connection monitoring goes inactive (e.g., a duration where the peer devices may not monitor the reliability of the communication connection). In one example, when the communication connection monitoring goes inactive, the peer devices can release system resources associated with the communication connection monitoring and save credential associations and security associations in a secure data store.

The peer devices can wake up from an inactive mode (e.g. switch to an active mode) and resume monitoring a communication connection when a wake up event occurs. A wake up event can include: a peer device being in an inactive mode for a threshold period of time, such as a rekey duration; a peer device receiving a request for a new connection; or a peer device receiving a request from a network manager to resume monitoring the communication connection. In this example, the key establishment and management protocols can switch the peer device to an inactive mode when the connection is reliable and switch the peer device to an active mode to monitor the connection when a wake up event occurs.

In one example, a first peer device can request a new or different connection with a second peer device that the first peer device is currently communicating with. In another example, the first peer device can request a new connection with a third peer device. In another example, a network manager can request that the first peer device and/or the second peer device switch connections.

In one example, when the wake up event is an expiration of a rekey duration, the peer device can switch to an active mode for monitoring the connection and the peer devices can establish a rekey session. The rekey session can be a security associations (SA) renegotiation where the peer devices fetch previously stored credentials. In another example, when the peer device switches to an active mode for monitoring because of a local request or a network request, the peer device can remain in active mode in view of request received. For example, when the request is to monitor the connection for a selected period of time to re-verify a stability of the connection, then the peer devices can monitor the connection for the selected period of time.

When the learning interval is at a lower bound (such as zero), the peer device can determine that the communication connection is unreliable. When the peer devices determine that the communication connection is unreliable, the communication connection between peer devices can be removed (e.g. torn down).

One advantage of using a connection reliability scheme to monitor a communication connection can be that the learning interval can be adjusted in view of a reliability of a communication connection between peer devices or the behavior of the network that the peer devices communicate in. In one example, for a communication connection that has been reliable for a first threshold period of time, when the communication connection is unreliable for a period shorter than a second threshold period of time (e.g. temporary irregularities in the communication connection), peer devices can tolerate the unreliability of the communication connection for the period of time that is shorter than the second threshold period of time. In this example, when the peer devices tolerate the temporary unreliability of the communication connection for the period of time that is shorter than the second threshold period of time, the peer devices can enable a communication connection time to recover because of the previous reliability of the communication connection. In another example, when the communication connection has been unreliable for a first threshold period of time (e.g. a long period of time), when the communication connection is reliable for a second threshold period of time (e.g. a short period of time) then the peer device may not consider the communication connection reliable until the communication connection has been reliable for a third threshold period of time (e.g. for a long duration of time).

Figure 4:
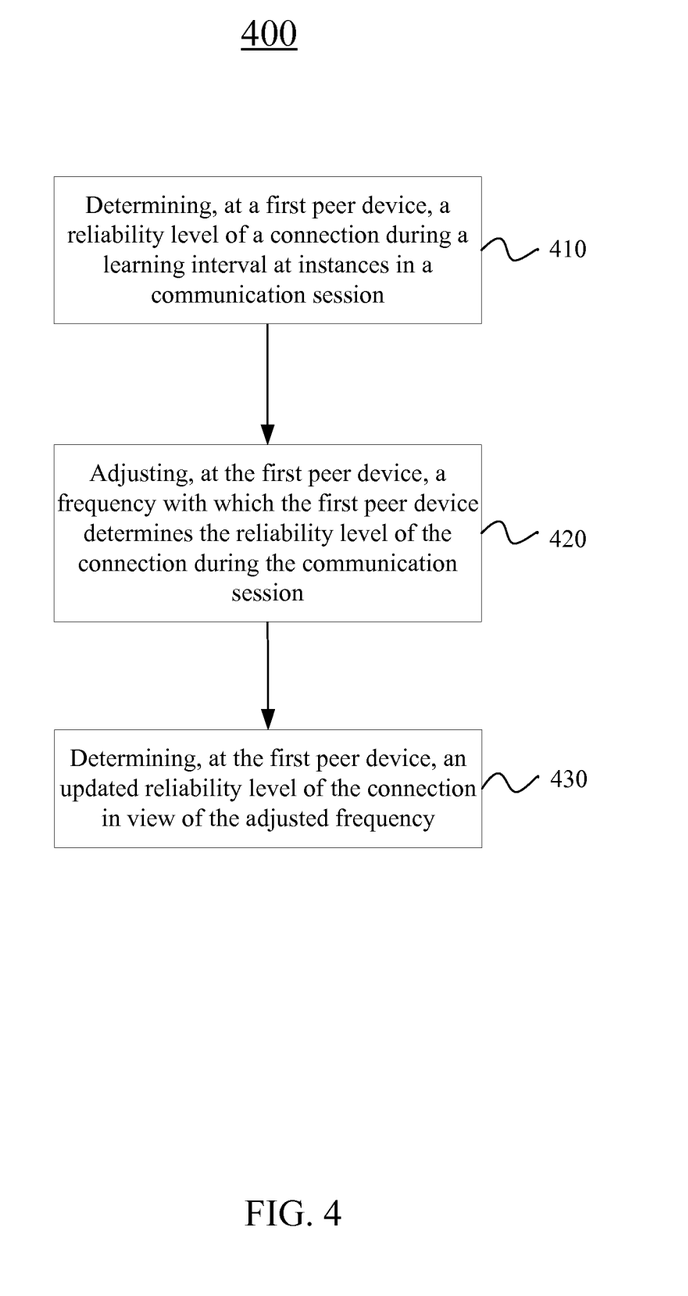
FIG. 4 is a flow diagram of a method of adjusting a reliability level of a connection in a communication network according to one embodiment.

FIG. 4 depicts a flow diagram of a method 400 of adjusting a reliability level of a connection in a communication network. Method 400 may be performed by processing logic that may comprise hardware (e.g., circuitry, dedicated logic, programmable logic, microcode, etc.), software (such as operations being performed by the MCU), firmware or a combination thereof. In one example, method 400 is performed by processor, a plurality of processors, a processor core, and/or a plurality of processor cores. Alternatively, other components of a computing system or software executing on the processor may perform some or all of the operations of the method 400.

Referring to FIG. 4, the method 400 can begin by determining, at a first peer device, a reliability level of a connection during a learning interval at instances in a communication session (block 410). In one example, the connection can be established between the first peer device and a second peer device using key establishment and management protocols. In another example, the reliability level can be determined in view of reliability criteria. The first peer device can adjust a frequency with which the first peer device determines the reliability level of the connection during the communication session (block 420). In one example, the frequency can be adjusted in view of the reliability level of the connection during the learning interval at a previous instance. The first peer device can determine an updated reliability level of the connection in view of the adjusted frequency (block 430).

In one example, the method can further include adjusting a usage level of a resource of the first peer device in the communication network in view of the reliability level of the connection, wherein the resource comprises a central processing unit (CPU) or a memory storage on of the first peer device. In another example, the reliability criteria can include: a packet loss rate between the first peer device and the second peer device; a packet delay between the first peer device and the second peer device; or a type of error that occurs at the first peer device, at the second peer device, or in the communications network. In another example, the method can include adjusting a length of the learning interval in view of the reliability level of the connection during the learning interval at the previous instance. In another example, the method can include switching the first peer device to an inactive mode when the frequency exceeds a threshold value. In another example, the method can include preserving the connection between the first peer device and the second peer device when the reliability level decreases below a threshold level for a first period of time and the reliability level previously exceeded a second reliability level for a second period of time. In another example, the method can include eliminating the connection between the first peer device and the second peer device when the reliability level decreases below a threshold level for a threshold period of time.

In one example, the connection can be a single communication channel between the first peer device and the second device. In another example, the connection can be multiple communication channels between the first peer device and the second device. In another example, the reliability level of the connection can be determined for a plurality of the multiple communication channels. In another example, the method can further include storing previous reliability level information of the connection and determine the reliability of the connection in view of the previous reliability level information. In another example, the method can further include performing an action on the communication connection in view of the reliability level of the communication connection. In another example, the action can include continuing to communicate data between the first peer device and the second peer device using the communication connection when the reliability level exceeds a threshold level or eliminating the communication connection between the first peer device and the second peer device when the reliability level decreases below the threshold level.

In one example, the action can include increasing a usage level of a resource of the first peer device in a communication network when the reliability level of the connection decreases below a first threshold value or decreasing a usage level of a resource of the first peer device in the communication network when the reliability level of the connection exceeds the first threshold value. In another example, the method can include assigning a first weight to the previous reliability level information and a second weight to a current reliability level of the connection and perform the action on the connection in view of the weighted previous reliability level information and the weighted current reliability level. In another example, the weighted previous reliability level information can have a greater weight than the weighted current reliability level. In another example, the threshold level can be adjusted in view of: a type of the first peer device; a type of the second peer device; a type of application communicating data at the first peer device; or a type of application communicating data at the second peer device.

In one example, the method can include switching the peer device to an inactive mode when the frequency exceeds a rekey duration for the connection. In another example, the method can include determining, at the peer device, the reliability level of the connection using a keepalive scheme, a deed peer detection (DPD) scheme, monitoring data traffic between the peer device and the other peer device, or determining packet loss traffic between the peer device and the other peer device. In another example, the method can include increase the reliability level of the connection as the frequency of the instances decreases or decrease the reliability level of the connection as the frequency of the instances increase.

Figure 5:
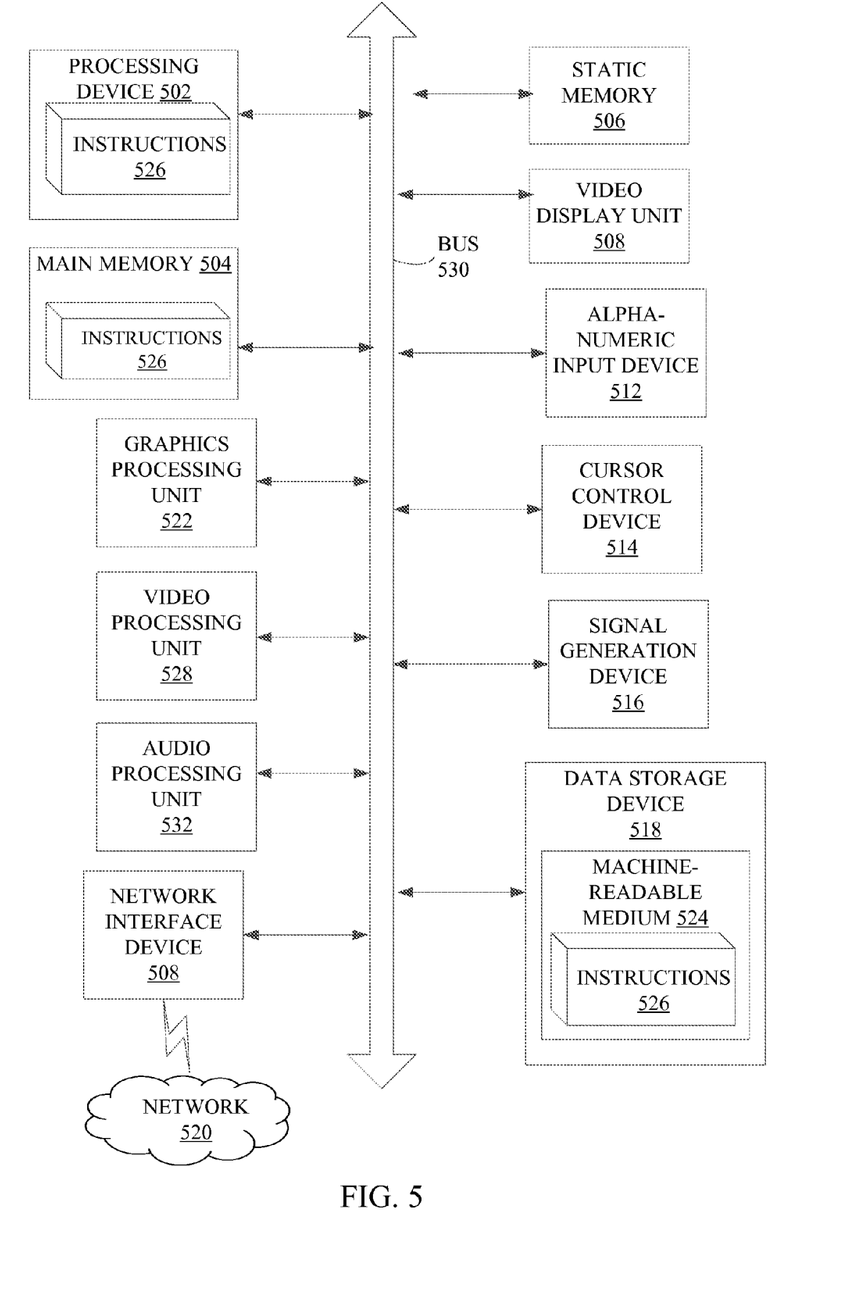
FIG. 5 illustrates a block diagram of one implementation of a computer system.

FIG. 5 illustrates a diagrammatic representation of a machine in the exemplary form of a computer system 500 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 508 (e.g., a liquid crystal display (LCD), a cathode ray tube (CRT), or a touch screen), an alphanumeric input device 512 (e.g., a keyboard), a cursor control device 514 (e.g., a mouse), and a signal generation device 516 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 520 via the network interface device 534.

While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

The invention claimed is:

1. A method comprising:
   determining, at a first peer device, a reliability level of a connection during a learning duration at instances in a communication session, the learning duration being a first length of time the first peer device monitors the connection,
   wherein the connection is established between the first peer device and a second peer device using a key establishment and management protocol, and
   wherein the reliability level is determined in view of reliability criteria;
   adjusting, at the first peer device, a second length of time between the instances of the learning duration in view of an increase or decrease in the reliability level of the connection during the learning duration;
   determining, at the first peer device, an updated reliability level of the connection in view of the adjusted second length of time; and
   changing the key establishment and management protocol in view of the updated reliability level, wherein the key establishment and management protocol comprises at least one of a protocol for managing a usage level for a resource of the first peer device or a protocol for managing the connection between the first peer device and the second peer device.

2. The method of claim 1,
   wherein the resource comprises a central processing unit (CPU) or a memory storage of the first peer device.

3. The method of claim 1, wherein the reliability criteria comprises at least one of: a packet loss rate between the first peer device and the second peer device; a packet delay between the first peer device and the second peer device; or a type of error that occurs at the first peer device, at the second peer device, or in a communications network.

4. The method of claim 1, further comprising adjusting a length of the learning duration in view of the reliability level of the connection during the learning duration at a previous instance.

5. The method of claim 1, further comprising switching the first peer device to an inactive mode when the updated reliability level exceeds a threshold value.

6. The method of claim 1, further comprising preserving the connection between the first peer device and the second peer device when the reliability level decreases below a threshold level for a first period of time and the reliability level previously exceeded a second reliability level for a second period of time.

7. The method of claim 1, further comprising eliminating the connection between the first peer device and the second peer device when the reliability level decreases below a threshold level for a threshold period of time.

8. A non-transitory computer-readable storage medium having instructions that, when executed by a processing device, cause the processing device to:
   determine, at a first peer device, a reliability level of a connection between the first peer device and a second peer device during a learning duration at instances in a communication session, wherein the reliability level is determined in view of reliability criteria and the learning duration is a first length of time the first peer device monitors the connection;
   adjust a second length of time between the instances of the learning duration in view of an increase or decrease in the reliability level of the connection during the learning duration;
   determine, at the first peer device, an updated reliability level of the connection in view of the adjusted second length of time; and
   change a key establishment and management protocol of the first peer device in view of the updated reliability level, wherein the key establishment and management protocol comprises at least one of a protocol for managing a usage level for a resource of the first peer device or a protocol for managing the connection between the first peer device and the second peer device.

9. The non-transitory computer readable storage medium of claim 8, wherein:
the connection is a single communication channel between the first peer device and the second device; or
the connection is multiple communication channels between the first peer device and the second device.

10. The non-transitory computer readable storage medium of claim 9, wherein the reliability level of the connection is determined for a plurality of the multiple communication channels.

11. The non-transitory computer readable storage medium of claim 8, the processing device to:
store previous reliability level information of the connection; and
determine the reliability of the connection in view of the previous reliability level information.

12. The non-transitory computer readable storage medium of claim 8, the processing device to:
perform an action on the connection in view of the reliability level of the connection, wherein the action comprises:
continuing to communicate data between the first peer device and the second peer device using the connection when the reliability level exceeds a threshold level; or
eliminating the connection between the first peer device and the second peer device when the reliability level decreases below the threshold level.

13. The non-transitory computer readable storage medium of claim 12, wherein the action further comprises:
increasing the usage level of a resource of the first peer device in a communication network when the reliability level of the connection decreases below a first threshold value; or
decreasing the usage level of a resource of the first peer device in the communication network when the reliability level of the connection exceeds the first threshold value.

14. The non-transitory computer readable storage medium of claim 12, the processing device to:
assign a first weight to previous reliability level information and a second weight to a current reliability level of the connection; and
perform the action on the connection in view of the weighted previous reliability level information and the weighted current reliability level.

15. The non-transitory computer readable storage medium of claim 14, wherein the weighted previous reliability level information has a greater weight than the weighted current reliability level.

16. The non-transitory computer readable storage medium of claim 12, wherein the threshold level is adjusted in view of:
a type of the first peer device;
a type of the second peer device;
a type of application communicating data at the first peer device; or
a type of application communicating data at the second peer device.

17. A peer device comprising:
a memory to store data; and
a processor coupled to the memory, the processor to:
determine, by the processor, a reliability level of a connection between the peer device and another peer device during a learning duration at instances in a communication session, wherein the reliability level is determined in view of reliability criteria and the learning duration is a first length of time the first peer device monitors the connection;
adjust, by the processor, a second length of time between the instances of the learning duration in view of an increase or decrease in the reliability level of the connection during the learning duration;
adjust, by the processor, the reliability level of the connection in view of the second length of time; and
change a key establishment and management protocol for the peer device in view of the reliability level, wherein the key establishment and management protocol comprises at least one of a protocol for managing a resource usage level of the first peer device or a protocol for managing the connection between the first peer device and the second peer device.

18. The peer device of claim 17, wherein the processor is to switch the peer device to an inactive mode when the second length of time exceeds a rekey duration for the connection.

19. The peer device of claim 17, wherein the processor is to determine, at the peer device, the reliability level of the connection using a keepalive scheme, a dead peer detection (DPD) scheme, monitoring data traffic between the peer device and the other peer device, or determining packet loss traffic between the peer device and the other peer device.

20. The peer device of claim 17, wherein the processor is to:
increase the reliability level of the connection as the second length of time decreases; or
decrease the reliability level of the connection as the second length of time increases.

* * * * *